No. 692,673. Patented Feb. 4, 1902.
J. P. M. JOSEPH.
PRUNER.
(Application filed Jan. 15, 1901.)
(No Model.)
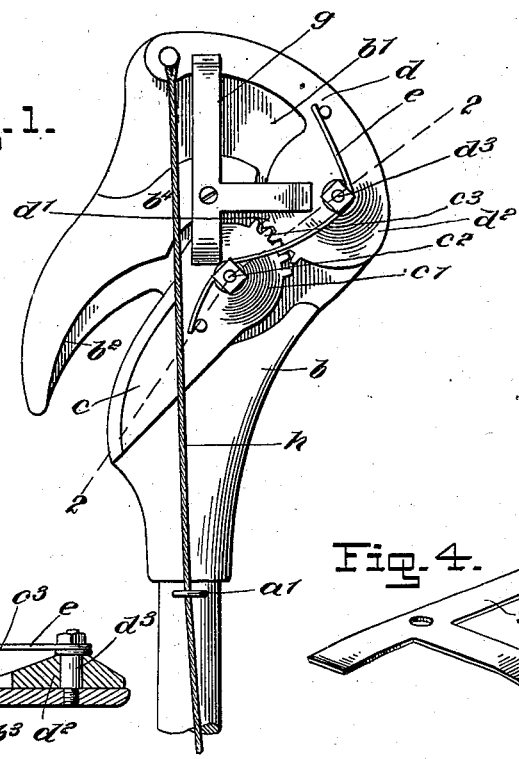
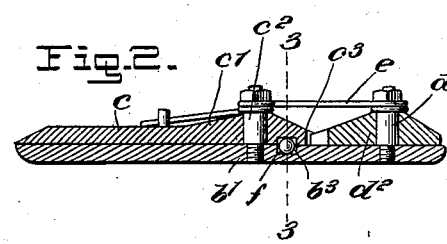
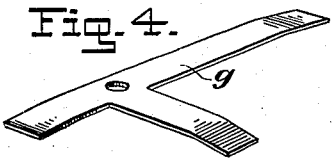
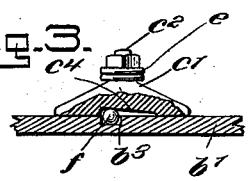
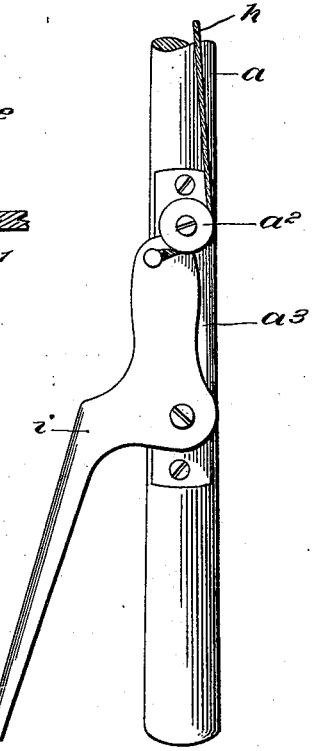
WITNESSES:
INVENTOR
John P. M. Joseph
BY
ATTORNEYS United States Patent Office.

JOHN P. M. JOSEPH, OF NEW YORK, N. Y.

PRUNER.

SPECIFICATION forming part of Letters Patent No. 692,673, dated February 4, 1902.

Application filed January 15, 1901. Serial No. 43,329. (No model.)

*To all whom it may concern:*

Be it known that I, JOHN P. M. JOSEPH, a citizen of the United States, and a resident of the city of New York, borough of Manhattan, in the county and State of New York, have invented a new and Improved Pruner, of which the following is a full, clear, and exact description.

This invention relates to a pruning instrument adapted particularly for pruning the branches of trees and high shrubbery by means of which the gardener may stand on the ground and conveniently reach the branches notwithstanding that they may be a considerable distance above his head. To this end the invention comprises certain peculiar parts forming pruning shears or blades. These parts are mounted on a pole, which may be of any length desired, and they are operated by a hand-lever arranged at the lower part of the pole in such a manner that the operation may be brought about by movement of the operator's hands in the same manner that a pair of shears are worked.

This specification is a specific description of one form of my invention, while the claims are definitions of the actual scope thereof.

Reference is to be had to the accompanying drawings, forming a part of this specification, in which similar characters of reference indicate corresponding parts in all the views.

Figure 1 is a side elevation of the invention with the pole broken away. Fig. 2 is a section on the line 2 2 of Fig. 1. Fig. 3 is a section on the line 3 3 of Fig. 2, and Fig. 4 is a detail view of the guard, which will be hereinafter fully described.

$a$ represents the pole, which may be constructed of wood or any other suitable material. At the top of this pole is fastened rigidly a head $b$, which comprises a flat or plate-like portion $b'$ and a projection $b^2$, forming a ledger-blade. With this ledger-blade $b^2$ coacts a shear-bade $c$, which has a circular tang $c'$, mounted on the flat or plate-like portion $b'$ of the head by means of a pin $c^2$. The tang $c'$ of the blade $c$ is also formed with gear-teeth $c^3$, arranged concentrically to the pin $c^2$ and meshed with corresponding teeth $d'$ on the circular butt $d^2$ of an arm $d$, which lies flat against the plate-like portion $b'$ of the head and is pivotally mounted on a pin $d^3$. A spring $e$ is coiled around the pins $c^2$ and $d^3$ and has its ends respectively engaged with the blade $c$ and arm $d$. This spring serves to hold the parts $c$ and $d$ in the position shown in Fig. 1. Movement of the arm $d$ downward from the position shown in Fig. 1 will cause the blade $c$ to be moved upward against the ledger-blade $b^2$, and by this movement the cutting operation is performed, as will be apparent.

For the purpose of causing the blade $c$ to move properly into engagement with the ledger-blade $b^2$, and thereby effectively and quickly cutting the branch, I employ a small ball $f$, (see Figs. 2 and 3,) which ball is fitted in a cavity $b^3$ of the head $b$ and forms virtually a sort of projection on the head. A stud might be employed instead of the ball; but the ball is used, since it will reduce the friction attending the operation of the parts. This ball $f$ bears against an inclined surface $c^4$ on the tang $c'$ of the blade $c$. When the blade is in the position shown in Figs. 1, 2, and 3, the ball $f$ will bear on the deepest portion of the inclined plane $c^4$; but as the blade $c$ moves toward the blade $b^2$ the inclined portion $c^4$ will run over the ball $f$, and the blade will thus be slightly twisted on its axis, causing the edge of the blade to bear firmly alongside the edge of the ledger-blade, and thus properly effecting the cut.

For holding the blade $c$ and the arm $d$ snugly engaged with the part $b'$ of the head during the movement of the knife and arm I provide a guard $g$ in the form of a three-armed spider, which is fastened rigidly to an elevated part $b^4$ on the head $b$ and the arms of which bear, respectively, on the arm $d$, the butt $d^2$ thereof, and the tang $c'$ of the shear-blade. Now it will be clear that this guard being continually engaged with the moving parts will prevent lateral displacement thereof and keep the gears $d'$ and $c^3$ properly meshed. This guard $g$ will not, however, prevent the operation of the ball $f$ and inclined plane $c^4$, since the twisting movement of the shear-blade brought about by these parts will tend to throw inward the part of the tang $c'$ which is engaged by the guard $g$.

For operating the arm $d$ I attach a cord, chain, or other suitable connection $h$ to the end of the arm and pass the cord downward through an eye $a'$, attached to the pole $a$. At the lower end of the pole the cord $h$ passes around a guide-roller $a^2$, mounted on a plate $a^3$, which is attached to the pole $a$ by screws, as shown. Fulcrumed on the plate $a^3$ is a hand-lever $i$, which is connected with the cord $h$, as shown, so that by rocking the hand-lever on its fulcrum, as shown, the cord may be drawn back and forth and the arm $d$ moved in the proper manner.

The operator while standing on the ground may conveniently prune trees of considerable height. The pole $a$ may be of any length desired, and, indeed, it is my purpose in making and vending the invention to deliver the parts $a^3$ and $b$ with the attached elements without the pole $a$, so as to permit the buyer to supply a pole of any length desired. Any number of poles of different length may be kept on hand and used according to the work to be performed.

By means of the arrangement of the hand-lever $i$ and the cord $h$, the latter with respect to the pulley $a^2$ on the pole or handle $a$, a person may readily operate the shear-blade by one hand—that is to say, by embracing the handle and the hand-lever and moving the hand-lever toward the handle.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. A pruner, comprising a head with a flat surface and adapted to be attached to a handle, the head having a ledger-blade thereon, a shear-blade mounted on the head and bearing snugly against the flat side thereof, the shear-blade having gear-teeth thereon, an operating-arm pivoted on the flat side of the head and bearing snugly against the same, the operating-arm having teeth meshing with the teeth on the shear-blade, means for swinging the arm, and a guard fastened to the head and having spring-arms projecting over and engaging the shear-blade and the operating-arm to hold them properly in position.

2. In a pruner, the combination with a head, comprising a ledger-blade, of a shear-blade mounted on the head, and a rolling member held by one of said parts and working on an incline surface on the other part.

3. A pruner, comprising a head with a flat surface, the head having a ledger-blade formed thereon, a shear-blade mounted on the head and bearing snugly against the flat side thereof, the shear-blade having gear-teeth, an operating-arm pivoted to the flat side of the head and bearing snugly against the same, said arm having teeth meshing with the teeth on the shear-blade, a guard fastened to the head and having spring-arms projecting over and engaging the shear-blade and the operating-arm, to hold them properly in position, a handle attached to the head, a hand-lever fulcrumed on the handle, and a flexible connection between the hand-lever and the operating-arm.

In testimony whereof I have signed my name to this specification in the presence of two subscribing witnesses.

JOHN P. M. JOSEPH.

Witnesses:
I. B. OWENS,
JNO. M. RITTER.